United States Patent
Obara et al.

(10) Patent No.: US 11,187,549 B2
(45) Date of Patent: Nov. 30, 2021

(54) SEARCH SYSTEM, VEHICLE, AND SERVER

(71) Applicant: TOYOTA JIDOSHA KABUSHIKI KAISHA, Aichi-ken (JP)

(72) Inventors: Ryohei Obara, Nagakute (JP); Masaki Ito, Toyota (JP); Makoto Kakuchi, Toyota (JP); Mutsumi Matsuura, Okazaki (JP); Hiroaki Sugiyama, Nagoya (JP); Yuichi Tashiro, Owariasahi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 171 days.

(21) Appl. No.: 16/589,197

(22) Filed: Oct. 1, 2019

(65) Prior Publication Data

US 2020/0141751 A1 May 7, 2020

(30) Foreign Application Priority Data

Nov. 1, 2018 (JP) .............................. JP2018-206426

(51) Int. Cl.
*G01C 21/34* (2006.01)
*G08G 1/127* (2006.01)
*G08G 1/123* (2006.01)

(52) U.S. Cl.
CPC ....... *G01C 21/3492* (2013.01); *G01C 21/343* (2013.01); *G08G 1/127* (2013.01)

(58) Field of Classification Search
CPC ......... G01C 21/34; G01C 21/36; G08G 1/123
See application file for complete search history.

(56) References Cited

U.S. PATENT DOCUMENTS

| | | | |
|---|---|---|---|
| 2016/0033289 A1* | 2/2016 | Tuukkanen | G01C 21/34 701/522 |
| 2017/0191841 A1* | 7/2017 | Marueli | G01C 21/20 |
| 2017/0268891 A1* | 9/2017 | Dyrnaes | G01C 21/3423 |
| 2017/0328728 A1* | 11/2017 | Salowitz | G01C 21/3423 |
| 2020/0175558 A1* | 6/2020 | Fujimoto | G01C 21/3453 |

FOREIGN PATENT DOCUMENTS

JP 2018-112930 A 7/2018

* cited by examiner

*Primary Examiner* — Tan Q Nguyen
(74) *Attorney, Agent, or Firm* — Hauptman Ham, LLP (57) ABSTRACT

The search system includes a vehicle and a server. The server includes: a first determination unit that determines a search route for searching for a user who rides on transportation based on a timetable of the transportation and map information; a second determination unit that determines a time for the vehicle to start moving from a current position of the vehicle to a boarding point of the transportation based on the current position, a current time, a location of the boarding point, and a departure time of the transportation; a third determination unit that determines a travel route to move from the current position to the boarding point based on the map information; and a transmitter unit that transmits the search route and the travel route to the vehicle.

12 Claims, 6 Drawing Sheets

SEARCH SYSTEM, VEHICLE, AND SERVER

INCORPORATION BY REFERENCE

The disclosure of Japanese Patent Application No. 2018-206426 filed on Nov. 1, 2018 including the specification, drawings and abstract is incorporated herein by reference in its entirety.

BACKGROUND

1. Technical Field

The disclosure relates to a search system, a vehicle, and a server.

2. Description of Related Art

In recent years, the population of local cities has been decreasing and there are areas with low population density, in other words, sparsely populated areas. In areas with low population density, there are cases where residences are located relatively far from boarding points of transportation such as buses and trains.

Japanese Unexamined Patent Application Publication No. 2018-112930 (JP 2018-112930 A) describes a travel management system of a vehicle traveling autonomously on a predetermined route. The travel management system includes a mobile information terminal that is carried by a person who wants to ride on a vehicle traveling autonomously and that is configured such that the person can access travel information of the vehicle traveling autonomously.

SUMMARY

According to the technology described in JP 2018-112930 A, a person who wants to ride can find a vehicle traveling autonomously using a mobile information terminal such as a tablet PC or a smartphone and ride on the vehicle, thereby moving to a destination. However, it is difficult for a person who does not have a mobile information terminal or a person who is not used to handle a mobile information terminal to use a vehicle.

The disclosure provides a search system, a vehicle, and a server that can autonomously search for a person who wants to ride so as to bring the person to a boarding point of transportation.

A first aspect of the disclosure relates to a search system including a vehicle and a server. The server includes: a first determination unit that determines a search route for searching for a user who rides on transportation based on a timetable of the transportation and map information; a second determination unit that determines a time for the vehicle to start moving from a current position of the vehicle to a boarding point of the transportation based on the current position, a current time, a location of the boarding point, and a departure time of the transportation; a third determination unit that determines a travel route to move from the current position to the boarding point based on the map information; and a transmitter unit that transmits the search route and the travel route to the vehicle.

According to this aspect, the server can determine the search route to arrive in time for departure of the transportation, and the vehicle can autonomously search for a person who wants to use the transportation and send the person to the boarding point of the transportation.

In the above aspect, the first determination unit may determine the search route based on a location of a residence within a predetermined distance from the boarding point and the number of residents living in the residence.

According to this aspect, it is possible to determine the search route that passes through a place where the density of residents is high. Thus, it is possible to determine the search route that passes through a place of high probabilities to pick up a person who wants to use transportation.

In the above aspect, the first determination unit may determine the search route based on the pick-up location that the vehicle has picked up a user and the number of time that the vehicle has picked up the user in the past.

According to this aspect, based on the past riding history, it is possible to determine a search route that passes through a place of high probability to pick up a person who wants to use transportation.

In the above aspect, the first determination unit may determine the search route based on the weather at the current time.

According to this aspect, it is possible to determine the search route that passes through a place of high probability to pick up a person who wants to use transportation, taking into consideration changes in the usage trend of the transportation in accordance with the weather.

In the above aspect, the first determination unit may determine the search route based on the current time.

According to this aspect, it is possible to determine the search route that passes through a place of high probability to pick up a person who wants to use transportation, taking into consideration changes in the usage trend of the transportation in accordance with a time range.

In the above aspect, the first determination unit may determine the search route based on an address of a user registered in advance.

According to this aspect, it is possible to determine the search route that preferentially passes the point of the registered user's address.

In the above aspect, the search system may further include a plurality of vehicles, and the first determination unit may determine the search route along which the vehicles as a group search for the user.

According to this aspect, even when the number of possible passengers per vehicle is one or two, a number of passengers can be sent to the boarding point at once.

In the above aspect, the first determination unit may determine a first search route along which a first group of vehicles, among the plurality of vehicles, travel and a second search route along which a second group of vehicles, among the plurality of vehicles, travel.

According to this aspect, the vehicles are divided into the first group and the second group so that a wider range can be searched. Thus, it is possible to search more people who want to use transportation and send them to the boarding points of the transportation.

In the above aspect, the search route may include a road having a width that does not allow an ordinary car to pass.

According to this aspect, it is possible to search for people who want to use transportation and who live in areas where ordinary cars are difficult to reach, and send them to the boarding points of the transportation.

In the above aspect, the vehicle may travel along the search route and the travel route by autonomous driving.

According to this aspect, it is possible to autonomously search for people who want to use transportation and send the people to the boarding points of transportation.

A second aspect of the disclosure relates to a vehicle. The vehicle includes a first determination unit that determines a search route for searching for a user who rides on transportation based on a timetable of the transportation and map information; a second determination unit that determines a time for the vehicle to start moving from a current position of the vehicle to a boarding point of the transportation based on the current position, a current time, a location of the boarding point, and a departure time of the transportation; a third determination unit that determines a travel route to move from the current position to the boarding point based on the map information; and an output unit that outputs guidance about the search route and the travel route.

According to this aspect, the vehicle can determine the search route to arrive in time for departure of the transportation, autonomously search for people who want to use the transportation, and send them to the boarding point of the transportation.

A third aspect of the disclosure relates to a server. The server includes: a first determination unit that determines a search route for searching for a user who rides on transportation based on a timetable of the transportation and map information; a second determination unit that determines a time for a vehicle to start moving from a current position of the vehicle to a boarding point of the transportation based on the current position, a current time, a location of the boarding point, and a departure time of the transportation; a third determination unit that determines a travel route to move from the current position to the boarding point based on the map information; and a transmitter unit that transmits the search route and the travel route to the vehicle.

According to the disclosure, it is possible to provide a search system, a vehicle, and a server that can autonomously search for a person who wants to use transportation and send the person to a boarding point of transportation.

BRIEF DESCRIPTION OF THE DRAWINGS

Features, advantages, and technical and industrial significance of executive entities will be described below with reference to the accompanying drawings, in which like numerals, like elements, and where.

DETAILED DESCRIPTION OF EMBODIMENTS

Embodiments will be described with reference to the accompanying drawings. In the drawings, those denoted by the same reference character have the same or similar structure.

First Embodiment

Figure 1:
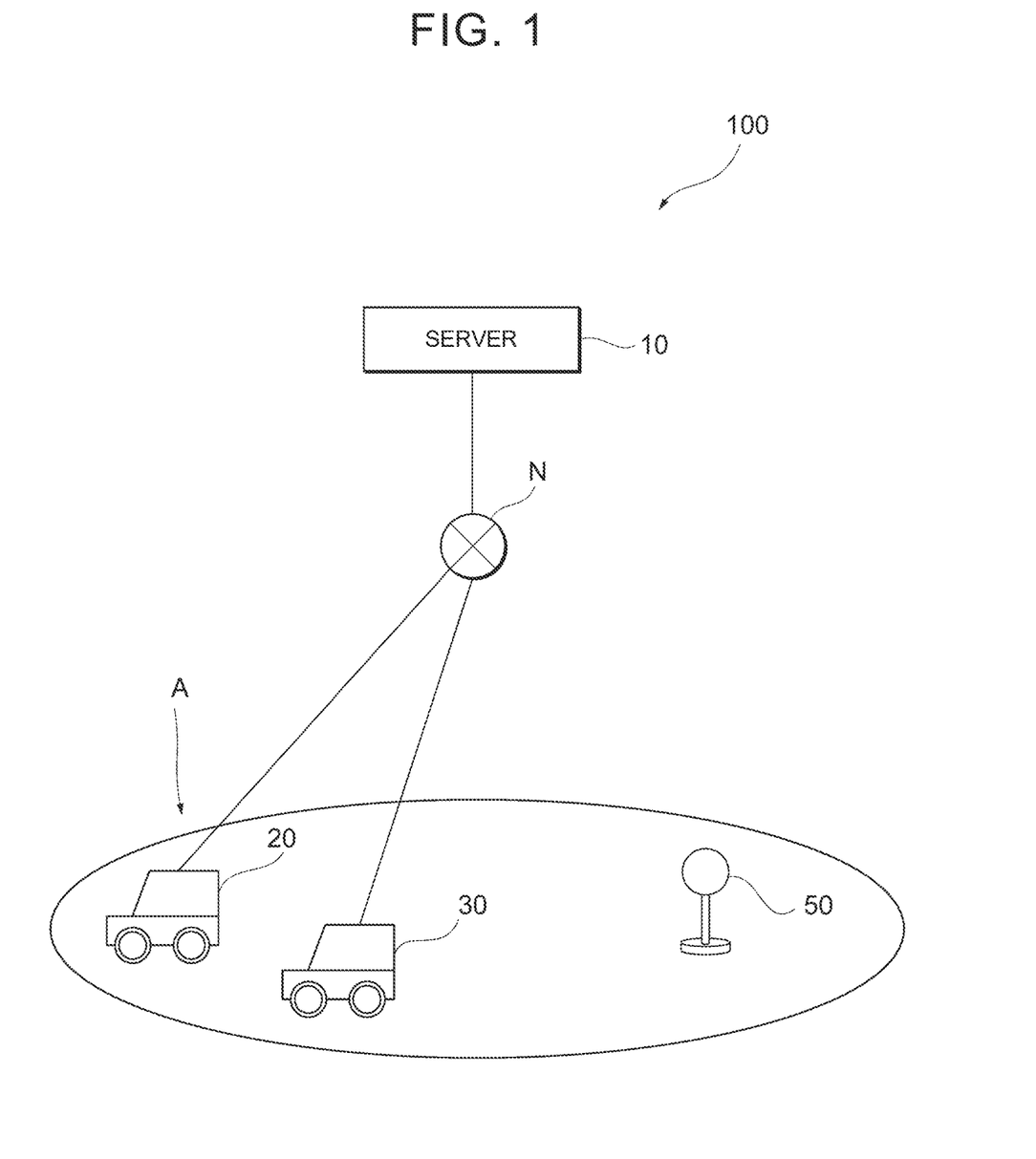
FIG. 1 is a diagram showing a network configuration of a search system according to a first embodiment.

FIG. 1 is a diagram showing a network configuration of a search system 100 according to a first embodiment. The search system 100 includes a server 10, a first vehicle 20, and a second vehicle 30. The server 10 and the first and second vehicles 20, 30 can communicate with each other via a communication network N. The communication network N is a wireless communication network, and may be, for example, the Internet.

In the present embodiment, a case where the first vehicle 20 and the second vehicle 30 are provided in a predetermined area A will be described. The predetermined area A may be an area of any size and any population density, and may be, for example, a sparsely populated area. In the predetermined area A, a boarding point 50 for transportation is provided. Here, transportation may be public or private transportation, and may include buses, trains, ships and planes. It is assumed that some of the residents who live in the predetermined area A do not have their own cars or are difficult to drive, and are difficult to walk from their home to the boarding point 50. Although the case where one boarding point 50 is provided in the predetermined area A is described in the present embodiment, a plurality of boarding points for transportation may be provided in a predetermined area.

The first vehicle 20 and the second vehicle 30 may be any vehicles, and may be, for example, one-passenger or two-passenger, electrically-driven ultra-compact mobility vehicles. The first vehicle 20 and the second vehicle 30 may autonomously travel on a search route and a travel route described later. This allows the first vehicle 20 and the second vehicle 30 to autonomously search for people who want to use transportation and send the people to the boarding points of transportation. The first vehicle 20 and the second vehicle 30 may display a route received from the server 10 on a display of a car navigation device and allow a driver to drive along the route.

Figure 2:
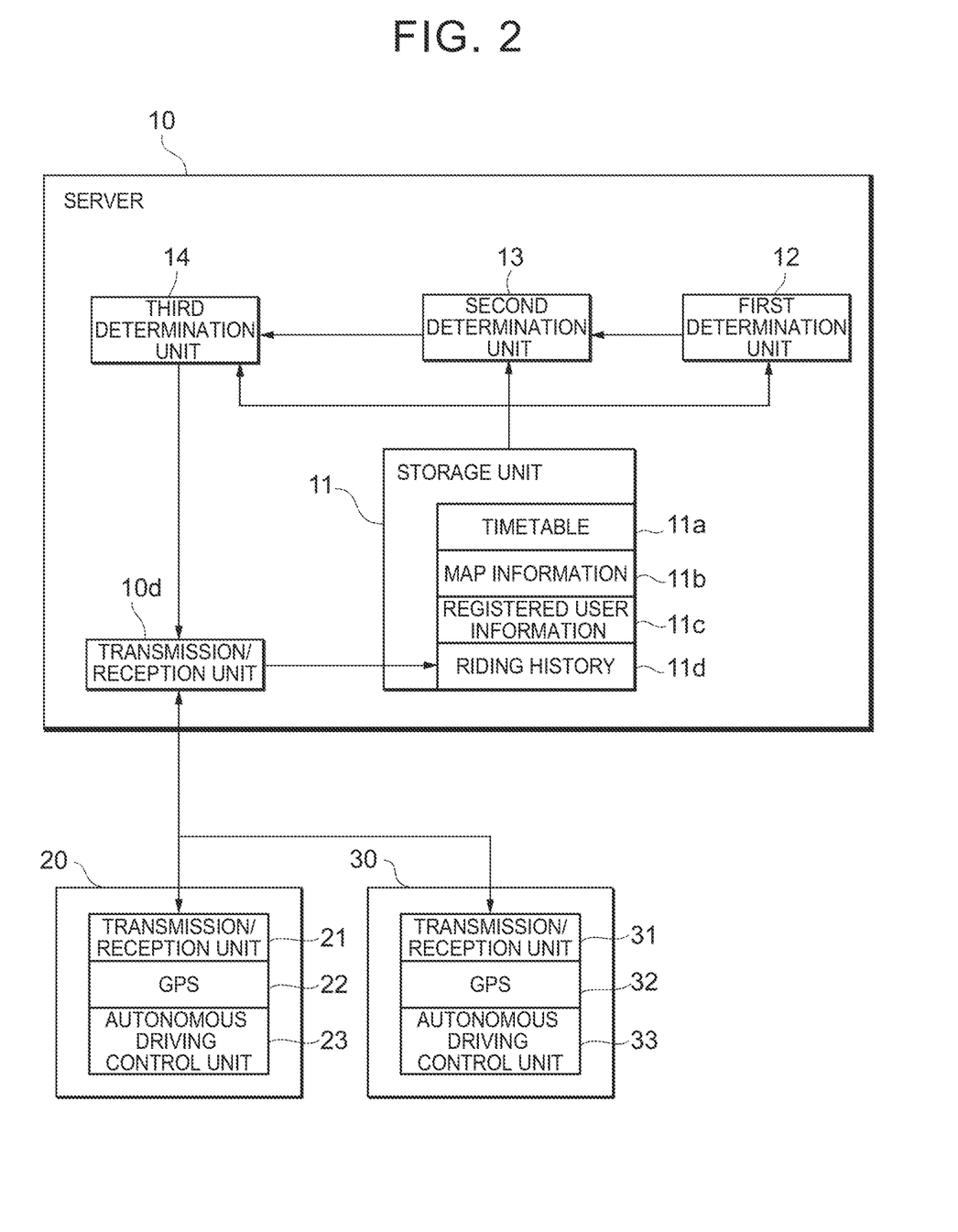
FIG. 2 is a functional block diagram of the search system according to the first embodiment.

FIG. 2 is a diagram showing functional blocks of the search system 100 according to the first embodiment. The search system 100 includes the server 10, the first vehicle 20, and the second vehicle 30, and the server 10 includes a storage unit 11, a first determination unit 12, a second determination unit 13, a third determination unit 14, and a communication unit 10d.

The storage unit 11 stores a timetable 11a, map information 11b, registered user information 11c and a riding history 11d. The timetable 11a is a timetable for transportation for which the boarding point 50 is provided, and includes a scheduled time of departure from the boarding point 50. The map information 11b may include at least information on a map indicating roads in the predetermined area A, and may include information on residences in the predetermined area A. The registered user information 11c may include information on users who have registered for use of the search system 100, and may include information on identification numbers and addresses of the users. The riding history 11d includes pick-up locations and the number of times that a search for a user succeeded in the past. Here, the pick-up locations where a search for a user succeeded mean locations where the user got on the first vehicle 20 or the second vehicle 30 or the first vehicle 20 or the second vehicle 30 has picked up the user.

The first determination unit 12 determines a search route for searching for a user who uses transportation, based on the timetable 11a for the transportation and the map information 11b. The first determination unit 12 may determine the search route based on the timetable 11a of the transportation and the map information 11b so as to search as wide a range as possible to arrive in time for the departure time of the transportation.

Here, the search route may include a road having a width that does not allow an ordinary car to pass. The search route may include a road that an ordinary car can not pass but an ultra-compact mobility vehicle can pass. Thus, it is possible to search for people who want to use transportation and who live in areas where ordinary cars are difficult to reach, and send them to the boarding points of the transportation.

The first determination unit 12 may determine the search route based on the locations of the residences within a predetermined distance from the boarding point 50 and the number of residents living in the residences. In this case, as the map information 11b, information on the residences and the number of residents in the predetermined area A is required. Determining the search route in this way allows the search route to pass through places where the density of residents is high. Thus, it is possible to determine the search route that passes through places of high probabilities to pick up people who want to use transportation.

The first determination unit 12 may determine the search route based on the pick-up locations and the number of times that the user was successfully searched out in the past. That is, the first determination unit 12 may determine the search route based on the riding history 11d. Thus, based on the past riding history, it is possible to determine the search route that passes through places of high probabilities to pick up people who want to use transportation.

The first determination unit 12 may determine the search route based on the weather at the current time. Here, the weather at the current time is the weather in the predetermined area A at the current time, and may be acquired via the communication network N. Thus, it is possible to determine the search route that passes through places of high probabilities to pick up people who want to use transportation, taking into consideration changes in the usage trend of transportation in accordance with the weather.

The first determination unit 12 may determine the search route based on the current time. The first determination unit 12 may determine the search route based on a time range that contains the current time. For example, four time ranges, namely, morning, noon, evening and night, may be set, and the search route may be determined based on the time range to which the current time belongs. Thus, it is possible to determine the search route that passes through places of high probabilities to pick up people who want to use transportation, taking into consideration changes in the usage trend of transportation in accordance with the time range.

The first determination unit 12 may determine the search route based on addresses of the users registered in advance. That is, the first determination unit 12 may determine the search route based on the registered user information 11c. This makes it possible to determine the search route that preferentially passes through the points of the registered users' addresses.

The search system 100 according to the present embodiment includes the plurality of vehicles (first vehicle 20 and second vehicle 30). In this case, the first determination unit 12 may determine a search route for searching users with a group of vehicles. The first determination unit 12 may determine, for example, a search route along which a group consisting of the first vehicle 20 and the second vehicle 30 search for users. Thus, even when the number of possible passengers per vehicle is one or two, a number of passengers can be sent to the boarding point at once. A plurality of groups of vehicles may be set. For example, when ten vehicles are in operation, a group consisting of two vehicles, a group consisting of three vehicles, and a group consisting of five vehicles may be set so that the first determination unit 12 determines a search route for each group of vehicles.

The first determination unit 12 may determine a first search route along which a first group of vehicles, among the plurality of vehicles, travel and a second search route along which a second group of vehicles, among the plurality of vehicles, travel. The first determination unit 12 may determine, for example, a first search route along which a first group consisting of two vehicles and a second search route along which a second group consisting of three vehicles. In this case, a vehicle group consisting of a larger number of vehicles may travel along a search route that passes through places where there are more people who want to ride on the vehicles. In this way, the vehicles are divided into the first group and the second group so that a wider range can be searched. Thus, it is possible to search more people who want to use transportation and sent them to the boarding points of the transportation.

The second determination unit 13 determines the time for the first vehicle 20 or the second vehicle 30 to start moving to the boarding point 50, based on the current position of the first vehicle 20 or the second vehicle 30, the current time, the location of boarding point 50 of the transportation, and the departure time of the transportation. The second determination unit 13 may calculate a time required for the first vehicle 20 or the second vehicle 30 to move to the boarding point 50 by dividing a scheduled travel distance from the current position of the first vehicle 20 or the second vehicle 30 to the boarding point 50 by an average speed of the first vehicle 20 or the second vehicle 30, and determine the time to start moving so as to arrive in time for the departure time of the transportation. The second determination unit 13 may determine the time to start moving in consideration of a road surface condition or a traffic congestion condition.

The third determination unit 14 determines a travel route to travel from the current position to the boarding point 50 based on the map information. The third determination unit 14 may determine a route that allows travel to the boarding point 50 in the shortest time, when there are a plurality of possible routes from the current position to the boarding point 50.

The communication unit 10d transmits the determined search route and the travel route to the first vehicle 20 and the second vehicle 30. The communication unit 10d may receive from the first vehicle 20 and the second vehicle 30 the pick-up location where the users have been picked up and the number of passengers. The communication unit 10d can be regarded as a transmitter according to the disclosure.

With the search system 100 according to the present embodiment, the server 10 can determine the search route so that the vehicle arrives in time for the departure of the transportation, and the vehicles can autonomously search for people who want to use the transportation and send them to the boarding point 50 of the transportation.

The first vehicle 20 includes a transmission/reception unit 21, a global positioning system (GPS) 22, and an autonomous driving control unit 23. The second vehicle 30 also includes a transmission/reception unit 31, a GPS 32, and an autonomous driving control unit 33. The functions of the transmission/reception unit 31, the GPS 32 and the autonomous driving control unit 33 are the same as those of the transmission/reception unit 21, the GPS 22 and the autonomous driving control unit 23, respectively. Therefore, the transmission/reception unit 21, the GPS 22 and the autonomous driving control unit 23 will be described below.

The transmission/reception unit 21 receives information on the search route and the travel route from the server 10.

The transmission/reception unit 21 may transmit, to the server 10, the location where the first vehicle 20 has succeeded in the search for the user.

The GPS 22 calculates the current position of the first vehicle 20 based on the signal received from a GPS satellite. The current position may be identified by latitude, longitude and altitude.

The autonomous driving control unit 23 controls the first vehicle 20 so that the first vehicle 20 autonomously travel along a set route. The first vehicle 20 may be equipped with a sensor (not shown) required for autonomous driving.

Figure 3:
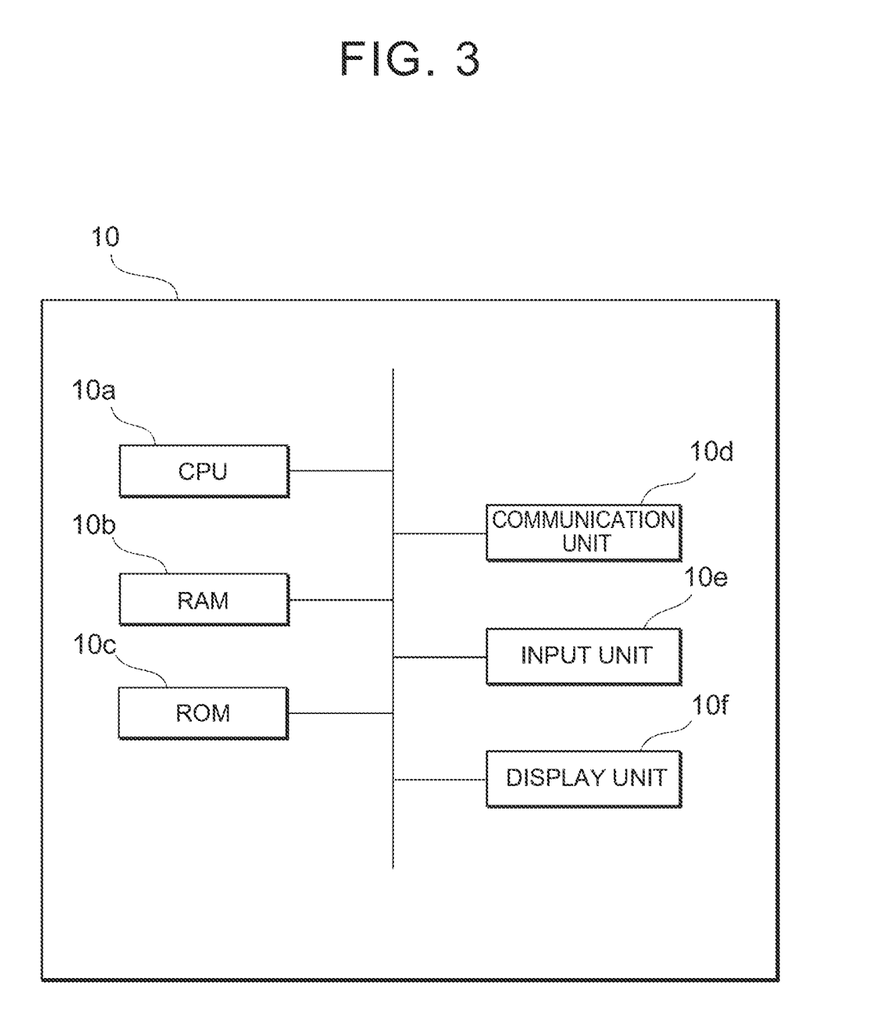
FIG. 3 is a diagram showing a physical configuration of a server according to the first embodiment.

FIG. 3 is a diagram showing a physical configuration of the server 10 according to the first embodiment. The server 10 includes a central processing unit (CPU) 10a serving as a computing device, a random access memory (RAM) 10b serving as a storage unit, a read-only memory (ROM) 10c serving as a storage unit, a communication unit 10d, an input unit 10e, and a display unit 10f. These configurations are mutually connected so as to be able to transmit and receive data via a bus. Although the case where the server 10 is composed of one computer is described in this example, the server 10 may be implemented using several computers.

The CPU 10a is a control unit that controls execution of a program stored in the RAM 10b or the ROM 10c, and calculates and processes data. The CPU 10a is a computing device that executes a program (search program) for determining a search route for searching for a user who rides on transportation. The CPU 10a receives various input data from the input unit 10e and the communication unit 10d, and displays the computation result of the input data on the display unit 10f or stores the result in the RAM 10b or the ROM 10c.

The RAM 10b is a rewritable storage unit, and may be, for example, a semiconductor memory device. The RAM 10b stores data such as a search program executed by the CPU 10a, the timetable 11a, the map information 11b, the registered user information 11c and the riding history 11d.

The ROM 10c is a computer-readable storage unit, and may be, for example, a semiconductor memory device. The ROM 10c stores, for example, a search program and data that is not rewritten.

The communication unit 10d is an interface for connecting the server 10 to external devices. The communication unit 10d may be connected to the first vehicle 20 and the second vehicle 30 via the Internet, for example, to receive the boarding history from the first vehicle 20 and the second vehicle 30. The communication unit 10d may download a timetable of transportation or map information via the Internet.

The input unit 10e receives an input of data from the user, and may include, for example, a keyboard, a mouse, and a touch panel.

The display unit 10f visually displays the result of computation by the CPU 10a, and may be, for example, a liquid crystal display (LCD).

The search program may be stored in a storage medium readable by a computer such as the RAM 10b or the ROM 10c to be provided, or may be provided via a communication network connected through the communication unit 10d. In the server 10, the CPU 10a executes the search program so that the operations of the first determination unit 12, the second determination unit 13 and the third determination unit 14 described with reference to FIG. 2 are realized. These physical configurations are exemplary and may not necessarily be independent configurations. For example, the server 10 may include a large-scale integration (LSI) in which the CPU 10a, the RAM 10b, and the ROM 10c are integrated.

Figure 4:
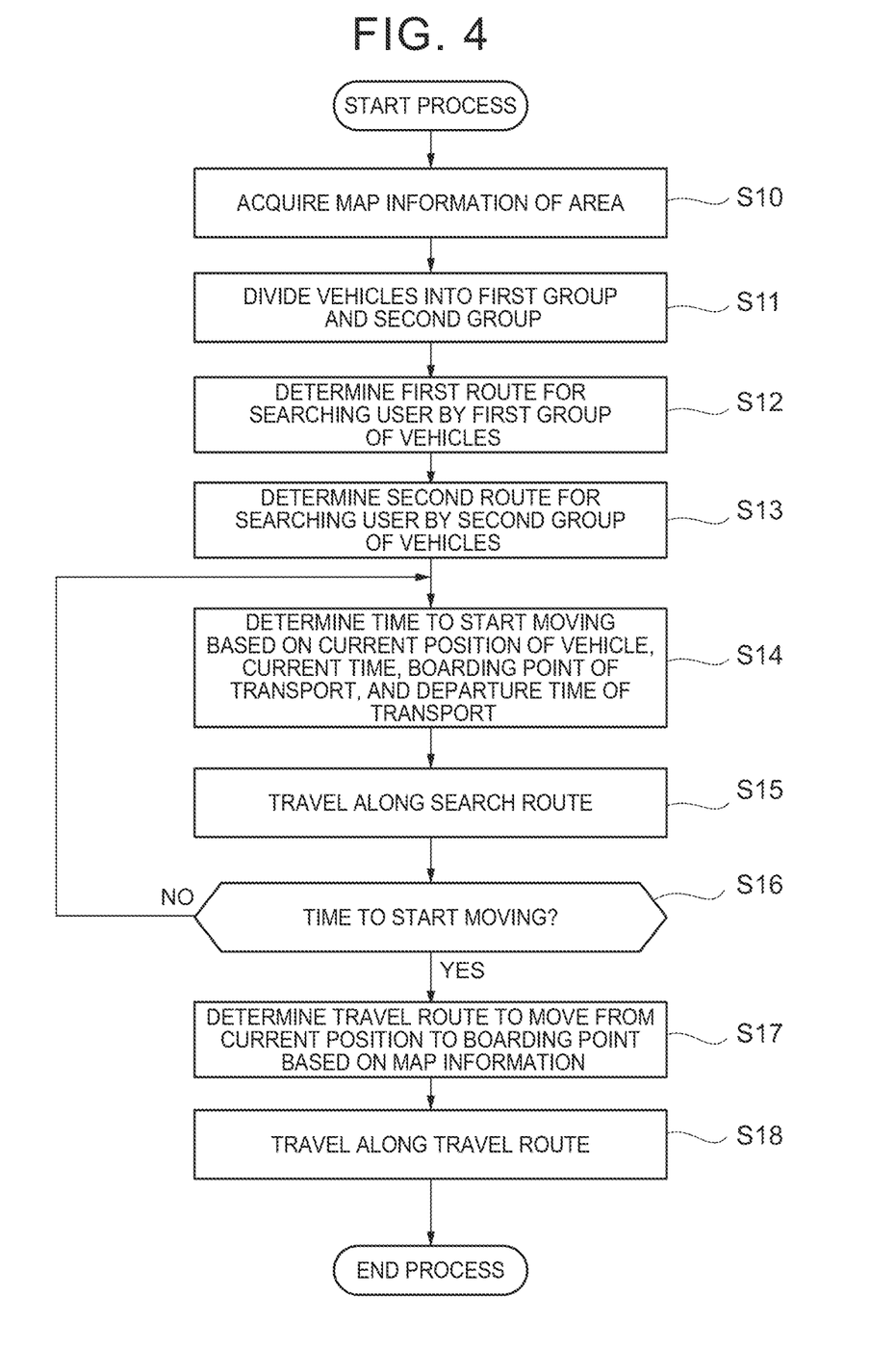
FIG. 4 is a flowchart showing a search process executed by the search system according to the first embodiment.

FIG. 4 is a flowchart showing a search process executed by the search system 100 according to the first embodiment. First, the server 10 acquires the map information 11b of the predetermined area A (S10).

Then, the server 10 divides the vehicles included in the search system 100 into the first group and the second group (S11). The server 10 may handle the vehicles as group, or may handle the vehicles individually.

Thereafter, the server 10 determines the first search route for searching for a user by the first group of vehicles (S12). The details of this process will be described using FIG. 4. The server 10 transmits the determined first search route to the first group of vehicles.

The server 10 determines the second search route for searching for a user by the second group of vehicles (S13). The details of this process are the same as those of the process of determining the first search route (S12). The server 10 transmits the determined second search route to the second group of vehicles.

The server 10 determines the time to start moving from the current position to the boarding point, based on the current position of the vehicle, the current time, the boarding point of the transportation and the departure time of the transportation (S14). This process may be carried out each time the current position of the vehicle is updated.

Then, the vehicles travel along the search routes (S15). The server 10 determines whether it is the time to move the vehicle to the boarding point (S16). When it is not the time to move (S16: NO), the time to start moving is determined again (S14) and the search continues (S15).

When the vehicle picks up a user, the pickup point may be transmitted to the server 10. When the vehicle picks up a user and the boarding capacity of the vehicle is reached, the user may be sent to the boarding point even though the time to start moving has not come. In this case, the vehicle may start searching for a user again.

When the time to start moving has come (S16: YES), the server 10 determines the travel route for the vehicle to move from the current position to the boarding point based on the map information (S17). The server 10 transmits the determined travel route to the vehicle.

Finally, the vehicle travels along the travel route, and sends the user the vehicle has picked up to the boarding point (S18). Thus, the search process ends.

Figure 5:
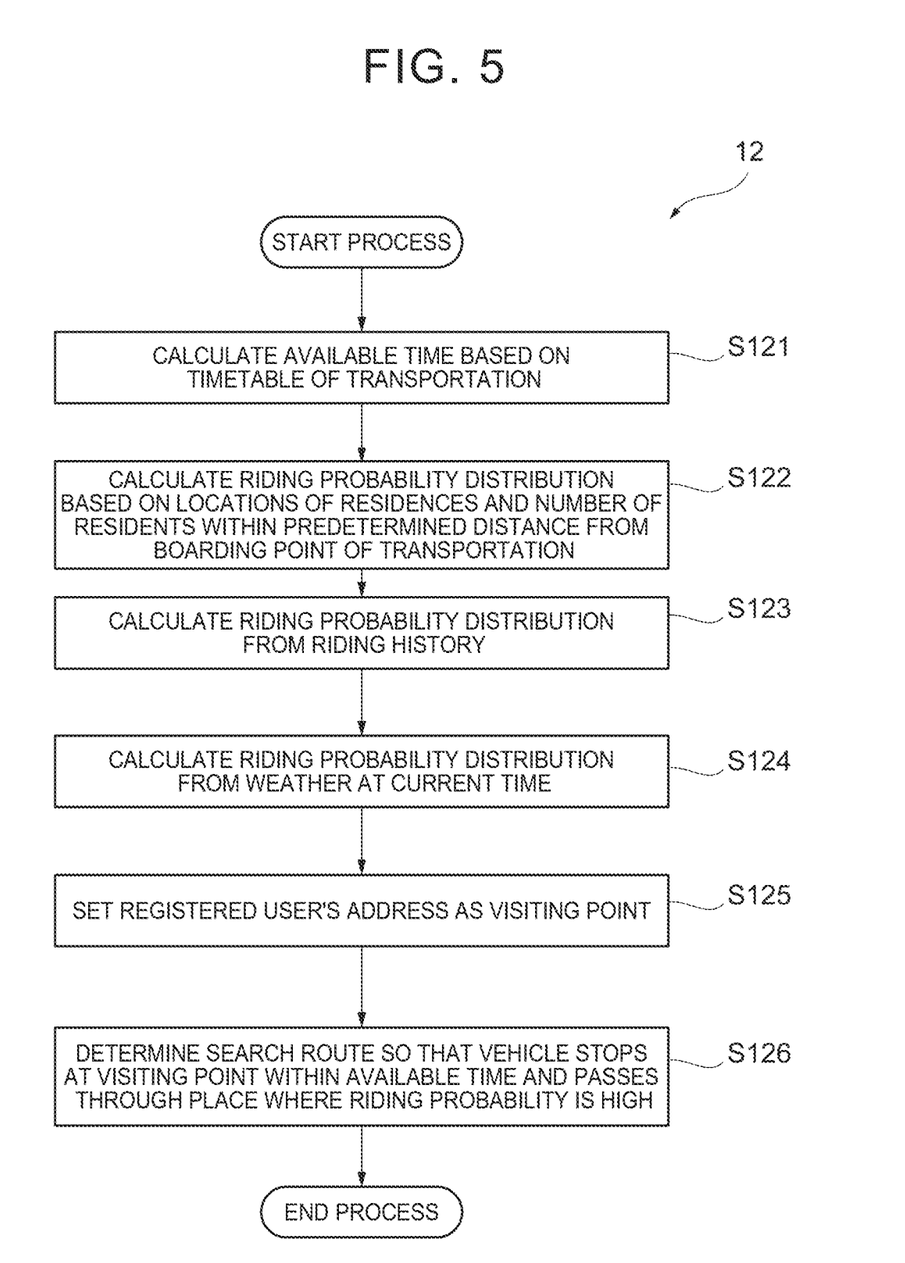
FIG. 5 is a flowchart showing a search route determination process executed by the server according to the first embodiment.

FIG. 5 is a flowchart showing the search route determination process executed by the server 10 according to the first embodiment. FIG. 5 shows the details of the process of determining the first search route (S12) of FIG. 4.

First, the server 10 calculates an available time based on the timetable of the transportation (S121). The server 10 may calculate a period of time to the next departure as the available time.

The server 10 calculates a riding probability distribution based on locations of residences and the number of residents within a predetermined distance from the boarding point of the transportation (S122). The server 10 may calculate, for example, the riding probability distribution in accordance with a mixed normal distribution. In that case, the riding probability distribution may be calculated by setting an average value of the normal distribution as the location of the residence and setting the variance of the normal distribution as a predetermined value and adding the normal distribution with a weight in accordance with the number of residents.

The server 10 also calculates the riding probability distribution from the riding history 11d (S123). For example, in the case of calculating the riding probability distribution with the mixed normal distribution, the server 10 may calculate the riding probability distribution such that a larger weight is assigned to a place where more people have been picked up.

Further, the server 10 calculates the riding probability distribution from the weather at the current time (S124). The server 10, for example, may filter the riding history 11d according to the weather at the current time, and calculate the riding probability distribution such that a larger weight is assigned to a place where more people have been picked up based on the filtered riding history 11d.

Furthermore, the server 10 sets the registered user's address as a visiting point (S125). That is, the server 10 determines the search route that passes through the point of the registered user's address at least once. The server 10 may determine the search route that passes through the point of the registered user's address within a predetermined time range.

The server 10 determines the search route so that the vehicle stops at the visiting point within the available time and passes through a place where the riding probability is high (S126). The search route may be determined using an existing algorithm. Thus, the search route determination process ends.

Second Embodiment

Figure 6:
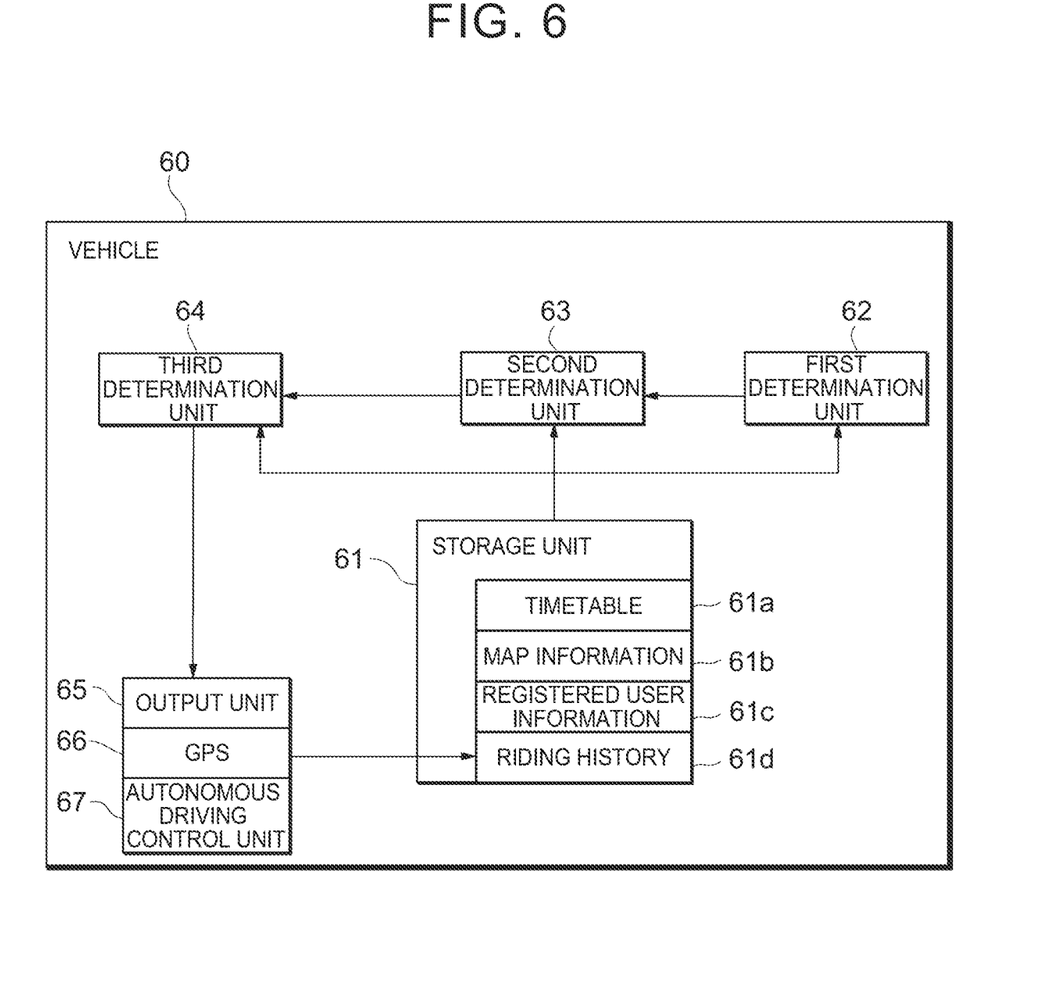
FIG. 6 is a functional block diagram of a vehicle according to a second embodiment.

FIG. 6 is a functional block diagram of a vehicle 60 according to a second embodiment. Unlike the first vehicle 20 and the second vehicle 30, the vehicle 60 according to the present embodiment includes a storage unit 61, a first determination unit 62, a second determination unit 63, a third determination unit 64, and an output unit 65, and does not include a transmission/reception unit. A GPS 66 and an autonomous driving control unit 67 are similar to the GPS 22 and the autonomous driving control unit 23.

The storage unit 61 may be similar to the storage unit 11 of the server 10 according to the first embodiment, and stores a timetable 61a, map information 61b, registered user information 61c, and a riding history 61d. Also, the first determination unit 62, the second determination unit 63 and the third determination unit 64 may be similar to the first determination unit 12, the second determination unit 13 and the third determination unit 14.

That is, the first determination unit 62 determines a search route for searching for a user who rides on transportation based on the timetable 61a of the transportation and the map information 61b. The second determination unit 63 determines the time for the vehicle 60 to start moving from the current position to a boarding point of the transportation, based on the current position of the vehicle 60, the current time, the location of the boarding point and the departure time of the transportation. Also, the third determination unit 64 determines a travel route to move from the current position to the boarding point based on the map information 61b.

The output unit 65 outputs guidance about the search route and the travel route. The output unit 65 may include a display such as a liquid crystal display device that presents a route and an audio output unit that outputs audio guidance.

The vehicle 60 according to the present embodiment can determine the search route to arrive in time for departure of the transportation, autonomously search for people who want to use the transportation, and send them to the boarding point of the transportation.

Above described embodiments are intended to facilitate understanding of the disclosure, and are not intended to be construed as limiting the disclosure. The elements included in the embodiments as well as arrangement, materials, conditions, shapes, sizes, and the like of the elements are not limited to those described above, and can be appropriately changed. In addition, configurations shown in different embodiments can be partially substituted or combined with each other.

What is claimed is:

1. A search system comprising:
a vehicle; and
a server, wherein the server includes:
a first determination unit that determines a search route for searching for a user who rides on transportation, independent from receiving a request from the user, based on a timetable of the transportation and map information;
a second determination unit that determines a time for the vehicle to start moving from a current position of the vehicle to a boarding point of the transportation based on the current position, a current time, a location of the boarding point, and a departure time of the transportation;
a third determination unit that determines a travel route to move from the current position to the boarding point based on the map information; and
a transmitter unit that transmits the search route and the travel route to the vehicle.

2. The search system according to claim 1, wherein the first determination unit determines the search route based on a location of a residence within a predetermined distance from the boarding point and the number of residents living in the residence.

3. The search system according to claim 1, wherein the first determination unit determines the search route based on a pick-up location that the vehicle has picked up a user and the number of time that the vehicle has picked up the user in the past.

4. The search system according to claim 1, wherein the first determination unit determines the search route based on weather at the current time.

5. The search system according to claim 1, wherein the first determination unit determines the search route based on the current time.

6. The search system according to claim 1, wherein the first determination unit determines the search route based on an address of a user registered in advance.

7. The search system according to claim 1, further comprising a plurality of vehicles, wherein the first determination unit determines the search route along which the vehicles as a group search for the user.

8. The search system according to claim 1, wherein the first determination unit determines a first search route along which a first group of vehicles, among the plurality of vehicles, travel and a second search route along which a second group of vehicles, among the plurality of vehicles, travel.

9. The search system according to claim 1, wherein the search route includes a road having a width that does not allow an ordinary car to pass.

10. The search system according to claim 1, wherein the vehicle travels along the search route and the travel route by autonomous driving.

11. A vehicle comprising:
a first determination unit that determines a search route for searching for a user who rides on transportation based on a timetable of the transportation and map information, wherein the transportation is different from the vehicle;
a second determination unit that determines a time for the vehicle to start moving from a current position of the vehicle to a boarding point of the transportation based on the current position, a current time, a location of the boarding point, and a departure time of the transportation;
a third determination unit that determines a travel route to move from the current position to the boarding point based on the map information; and
an output unit that outputs guidance about the search route and the travel route.

12. A server comprising:
a first determination unit that determines a search route for searching for a user who rides on transportation based on a timetable of the transportation and map information;
a second determination unit that determines a time for a vehicle to start moving from a current position of the vehicle to a boarding point of the transportation based on the current position, a current time, a location of the boarding point, and a departure time of the transportation, wherein the boarding point is independent from an input from a user;
a third determination unit that determines a travel route to move from the current position to the boarding point based on the map information; and
a transmitter unit that transmits the search route and the travel route to the vehicle.

* * * * *